(12) United States Patent
Smith

(10) Patent No.: US 10,380,691 B1
(45) Date of Patent: Aug. 13, 2019

(54) LOCATION VARIABLE INSURANCE

(75) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1016 days.

(21) Appl. No.: 12/062,075

(22) Filed: Apr. 3, 2008

(51) Int. Cl.
 *G06Q 40/00* (2012.01)
 *G06Q 40/08* (2012.01)
 *G06Q 10/04* (2012.01)

(52) U.S. Cl.
 CPC .......... *G06Q 40/08* (2013.01); *G06Q 40/00* (2013.01); *G06Q 10/04* (2013.01)

(58) Field of Classification Search
 CPC ........ G06F 17/60; G06Q 40/00; G06Q 10/04; G06Q 40/08
 USPC .......................................................... 705/4
 See application file for complete search history.

(56) References Cited

U.S. PATENT DOCUMENTS

| | | | |
|---|---|---|---|
| 7,240,017 B2 * | 7/2007 | Labelle .................. | G06Q 40/08 705/4 |
| 7,343,306 B1 * | 3/2008 | Bates et al. ........................ | 705/4 |
| 7,441,197 B2 | 10/2008 | Tschiegg et al. | |
| 8,239,221 B2 * | 8/2012 | Harkensee et al. ............... | 705/4 |
| 2001/0039509 A1 | 11/2001 | Dar et al. | |
| 2002/0161609 A1 | 10/2002 | Zizzamia et al. | |
| 2002/0188480 A1 | 12/2002 | Liebeskind et al. | |
| 2003/0033173 A1 | 2/2003 | Suzuki et al. | |
| 2004/0039609 A1 * | 2/2004 | Burkitt .............................. | 705/4 |
| 2004/0049410 A1 | 3/2004 | Johnson et al. | |
| 2004/0153362 A1 | 8/2004 | Bauer et al. ..................... | 705/10 |
| 2005/0071202 A1 * | 3/2005 | Kendrick .......................... | 705/4 |
| 2006/0015360 A1 | 1/2006 | Ochs et al. | |
| 2006/0036473 A1 | 2/2006 | Taylor | |
| 2006/0095301 A1 | 5/2006 | Gay | |
| 2006/0100912 A1 * | 5/2006 | Kumar et al. .................... | 705/4 |
| 2006/0282295 A1 | 12/2006 | McComb et al. | |
| 2007/0027726 A1 * | 2/2007 | Warren et al. ................... | 705/4 |
| 2007/0250350 A1 | 10/2007 | Dillard | |
| 2008/0004915 A1 | 1/2008 | Brown | |
| 2008/0103841 A1 | 5/2008 | Lewis et al. | |
| 2008/0243558 A1 | 10/2008 | Gupte | |
| 2010/0138244 A1 * | 6/2010 | Basir ..................... | G06Q 10/04 705/4 |

OTHER PUBLICATIONS

Amendment to Policy Issued in Free Trade Zone: Applicable Notice Requirement (OGC Op. No. 10-11-06).*
"Geographic Rating of Individual Risk Transfer Costs Without Territorial Boundaries" [Retrieved on Sep. 2, 2008]. Retrieved from the internet http://www.casact.org/pubs/forum/96wforum/96wf097.pdf.

* cited by examiner

Primary Examiner — Clifford B Madamba
(74) Attorney, Agent, or Firm — Fletcher Yoder, P.C.

(57) ABSTRACT

Methods, systems and computer readable instructions to provide, and receive, location-variable insurance. Risk zones may be created that have geographic boundaries. A risk zone is a geographic area that has a risk of loss factor associated with the risk zone. Risk zones may have a temporal range, where the existence, geographic boundaries and risk of loss factor for a risk zone may change with time. A location of a person or thing insured may be determined on an on-going basis, providing the opportunity for continued coverage over a wide range of risk of loss factors.

25 Claims, 6 Drawing Sheets

LOCATION VARIABLE INSURANCE

CROSS REFERENCE TO RELATED APPLICATIONS

This application is related by subject matter to the inventions disclosed in the following commonly assigned applications: U.S. patent application Ser. No. 12/062,089 and U.S. patent application Ser. No. 12/062,092, each filed on Apr. 3, 2008 and each entitled "Location Variable Insurance." The disclosure of each application is incorporated by reference herein in its entirety.

BACKGROUND

There are many problems with current methods of providing insurance. Insurance coverage may be discontinuous based on factors that may or may not be in the control of the policy holder. For example, a life insurance policy may provide protection in the case where the person insured dies. However, the life insurance policy may have exclusions that work to defeat the coverage, even though the person insured may want the coverage to continue. For example, a life insurance policy may exclude coverage of an insured person when the insured person enters a combat zone. Coverage is excluded because the additional risk of entering a war zone is not the risk that the insurance company agreed to provide. Thus, coverage discontinues when the insured enters the combat zone even though the person insured may want coverage to continue and may be willing to pay an additional premium for the coverage to continue. It may be possible for a person to take separate measures to continue coverage, such as contacting the insurance company, getting a quote for a rider, accepting the terms of the rider and paying for the rider. However, such actions may be inconvenient, impracticable or impossible based on the circumstances and frequency of travel. Additional complications may arise when travel takes an insured to multiple locations that are excluded, especially when the insured may not know where his travels may take him.

In another example, automobile coverage may exclude coverage when an automobile that is registered in the United States enters another country, such as Mexico. As before, coverage is excluded because the additional risk of entering Mexico is not the risk that the insurance company agreed to provide. However, if one travels to Mexico seldom or often, the person may want automobile coverage to continue. It may be inconvenient, impracticable or impossible to make arrangements for coverage. Additional complications may arise when the travel is frequent or takes place outside of hours when insurance company personnel are available to make arrangements for additional coverage.

Another example is when events cause a discontinuation in an insurance policy. For example, some insurance policies may exclude coverage based on travel to a state designated by the State Department of the United States with a travel warning. Issuance of such a travel warning may instantaneously discontinue coverage where coverage existed the moment before. This may be especially distressing to people who frequently travel to foreign countries, such as businessmen, diplomats or members of the United States armed services. Although such acts may cause a discontinuance in insurance coverage, the insured may want the coverage to automatically continue and may be willing to pay the increased premium for coverage.

SUMMARY

In view of the above shortcomings and drawbacks, computer-readable media, methods, software applications and computer systems for providing location-variable insurance are provided.

The claimed embodiments may provide systems and methods to approximately track the location of a person or thing insured, as a function of time, including determining whether the person or thing insured changes risk zones. Risk zones are areas with geographic boundaries. Risk zones may have a risk of loss factor associated with the risk zone. A risk of loss factor may be related to a determined chance that a risk of loss may occur. In addition to geographical boundaries, a risk zone may have a temporal range. Tracking the location of a person or thing insured, as a function of time, allows record keeping of the amount of time the person or thing insured spends in a given risk zone.

Tracking geographic location as a function of time may allow an insurer to provide, and a policy holder to receive, coverage that is continuous, with accurately adjusted premiums. In addition, tracking geographic location as a function of time may allow an insurer to provide, and a policy holder to receive, accurate premiums based on a more accurate risk of loss determination and on the actual location of a person or thing insured.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed.

DETAILED DESCRIPTION

Figure 1:
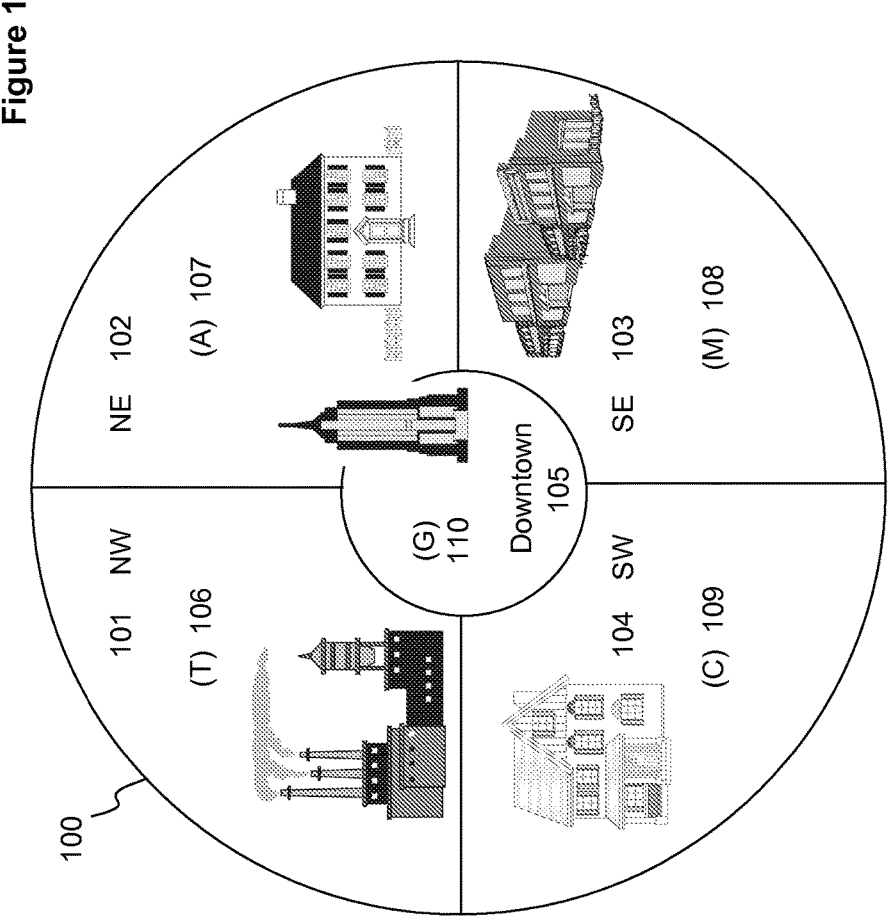
FIG. 1 illustrates exemplary risk zones.

The subject matter of the described embodiments is described with specificity to meet statutory requirements. However, the description itself is not intended to limit the scope of this patent. Rather, the described embodiments may include different steps or elements. Moreover, although the term "step" may be used herein to connote different aspects of methods employed, the term should not be interpreted as implying any particular order among or between various steps herein disclosed unless and except when the order of individual steps is explicitly described.

Insurance, such as property insurance and life insurance, is an important risk-shifting device. The financial model behind providing insurance is that a provider of insurance may be able to determine a risk of loss for a person or thing insured. Based on the anticipated risk of loss, an insurer can charge a premium to provide insurance coverage. In a simplified example, the insurer may consider selling one-hundred car insurance policies that insure the loss of one-hundred different cars for a period of one year. The insurance coverage may provide twenty thousand dollars for the total loss of an insured car, i.e., if a car is irreparably damaged in an accident, the insurer may pay the beneficiary twenty thousand dollars. If the anticipated risk of loss for each of the one-hundred different cars is five percent, the anticipated incurred loss is one-hundred thousand dollars. The insurer may charge a premium of one-thousand two-hundred fifty dollars for each of the one-hundred car insurance policies. Thus, the insurer may receive one-hundred twenty-five thousand dollars and may pay out one-hundred thousand dollars, achieving a theoretical gross profit of twenty-five thousand dollars (twenty-five percent) in this simplified example.

Insurers may implement exclusions as part of an insurance policy. For example, an insurance policy may not cover an automobile registered in California if it is taken into Mexico. In another example, a life insurance policy may exclude coverage for individuals when they enter a combat zone.

Insurers may introduce exclusions for any reason, including keeping underwriting simple and premiums low. For example, the risk of loss associated with driving in Mexico may be much higher than the risk of loss associated with driving in California. So, providing insurance coverage to all California drivers that covers driving in Mexico may cause much higher premiums. Many cars that are registered in California may never be taken into Mexico, so, it may be unfair for all California car owners to pay for insurance that covers an automobile registered in California to be driven in Mexico. However, loss of coverage due to an exclusion may have severe consequences for the insured.

For example, a family may include a husband and wife and multiple children. Further, only one of the husband or wife may work, while the other spouse raises the children. Such a family is exposed to great risk if the wage earning spouse dies. Life insurance provides protection to such a family by providing a payment to the non-wage earning spouse in the event the wage earning spouse dies. If the wage earning spouse dies while the wage earning spouse is located in an excluded area, a combat zone for example, then the non-wage earning spouse may receive no payment, which may cause great hardship.

In another example, a person may need an automobile for employment. Such a person is exposed to great risk if there is an accident that destroys the car and the person cannot afford another car and cannot make arrangements to work without a car. Automobile insurance provides protection to such a person. If a person purchases insurance coverage on a car, then the person may receive a payment in the event that an accident destroys the car. Thus, the person, who is a policy holder, may use the payment to purchase a new car.

The claimed embodiments may provide methods, computer readable media and systems that may mitigate the effects of some insurance policy exclusions by continuing or offering coverage throughout different risk zones. Further, the claimed embodiments may reduce premiums because premiums may reflect the approximate actual time spent in risk zones.

A risk zone may be a geographical area that may have a defined and approximately homogeneous risk of loss factor. A risk of loss factor may relate to the probability of a risk of loss assigned to the risk zone, by an insurer for example, for the person or thing covered. A risk of loss factor may correspond to the magnitude of the premium charged for coverage. For example, if there is a lower risk of loss, an insurer may charge a lower premium. For a higher risk of loss, an insurer may charge a higher premium. For example purposes, this application divides risk of loss factors into 26 categories. Further, an alphabet scale, from A-Z, is used to represent the risk of loss factors. A represents the lowest risk of loss factor and therefore the lowest risk of loss. Z represents the highest risk of loss factor, and therefore the highes risk of loss.

FIG. 1 illustrates an exemplary city 100 that may be divided into risk zones for an automobile insurance policy. City 100 may include a northwest section 101 with a 'T' risk of loss factor 106, a northeast section 102 with an 'A' risk of loss factor 107, a southeast section 103 with an 'M' risk of loss factor 108, a southwest section 104 with a 'C' risk of loss factor 109 and a downtown section 105 with a 'G' risk of loss factor 110. The city 100 has a wide range of risk zones, ranging from a 'T' risk of loss factor 106 in the northwest section 101 to an 'A' risk of loss factor 107 in the northeast section 102. If an insurer provides coverage for the entire city 100, the insurer may assume that a driver may drive through the northwest section 101 during some part of the coverage period. Because the northwest section 101 has the highest risk of loss, assuming that a driver in the city 100 may drive through the northwest section 101 during some part of the coverage period may unduly raise insurance rates for some drivers. For example, an automobile that is driven solely in the northeast section 102 would be charged an unduly high premium because the policy holder is charged as if the automobile was driven part of the time in the section with the highest risk of loss. The claimed embodiments may provide a way to track the driving pattern of an automobile, allowing for an insurance premium that may be based on the approximate time an automobile is driven in each risk zone.

A risk zone may also have a temporal range. For example, a risk zone that corresponds to a downtown area may have one risk of loss factor at 12:00 PM and a different risk of loss factor at 12:00 AM. In another example, a tourist town may have a higher risk of loss factor during tourist season versus a low season. In addition, the number and geographic scope of risk zones may change with time or events.

Figure 2:
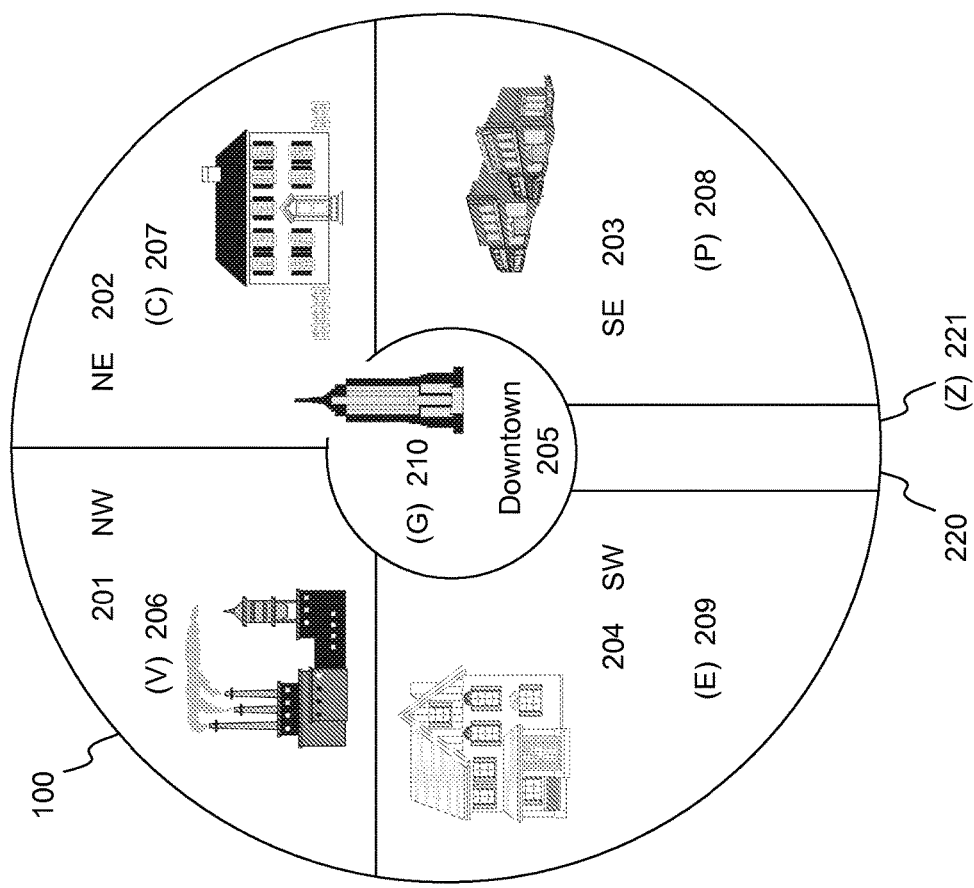
FIG. 2 illustrates how risk zones may change as a function of time.

FIG. 2 illustrates how risk zones may be adjusted over time. FIG. 1 may have illustrated the city 100 at a time of 12:00 PM. FIG. 2 may illustrate the city 100 at 12:00 AM. City 100 may include a northwest section 201 with a 'V' risk of loss factor 206, a northeast section 202 with an 'C' risk of loss factor 207, a southeast section 203 with an 'P' risk of loss factor 208, a southwest section 204 with a 'E' risk of loss factor 209 and a downtown section 205 with a 'G' risk of loss factor 210. As can be seen by comparing FIG. 2 to FIG. 1, the geographic boundaries of city 100 have not changed. However, due to an increased risk of loss associated with the late night time frame, the risk of loss factors have generally increased throughout city 100.

As indicated in FIG. 2, the geographic boundaries of the risk zones in city 100 have been adjusted, except for the downtown area. For example, the size of the northwest and northeast section is smaller at 12:00 AM than at 12:00 PM. In addition, a new risk zone is created. The new risk zone is a construction corridor section 220, with a 'Z' risk of loss factor 221. In addition, the geographic shape of southeast section 203 and southwest section 204 has been adjusted due to the new construction corridor section 220. The new construction corridor section 220 may be assigned a 'Z' risk of loss factor 221 because construction only occurs at night in this area and is accompanied by a high rate of accidents.

It should be noted that FIG. 1 and FIG. 2 illustrate simplified examples of risk zones and how the risk zones may be adjusted over time. Any number of risk zones may be assigned to a given geographic area. Further, the risk zones may be adjusted in any number of ways as a factor of time, with any number of new zones that may be created, or any number of existing zones modified or deleted. Risk zone creation, deletion, and changes, including changes to geographical boundaries, risk of loss factors, or temporal boundaries, may be made by any method, including real-time updates. For example, in response to a riot in an area, risk zones may be created, deleted and/or changed in and around the area to adjust for the riot in real-time. Another way risk zones may be updated is to perform an analysis of new data. For example, risk zones that were created based on data from a previous year may need to be adjusted based on new data.

The claimed embodiments may provide a way to approximately track the location of a person or thing insured, as a function of time, including determining whether the person or thing insured changes risk zones. Tracking geographic location as a function of time may allow an insurer to provide, and a policy holder to receive, coverage that is continuous, with accurately adjusted premiums. In addition, tracking geographic location as a function of time may allow an insurer to provide, and a policy holder to receive, accurate premiums based on a more accurate risk of loss determination based on the actual location of a person or thing insured.

Figure 3:
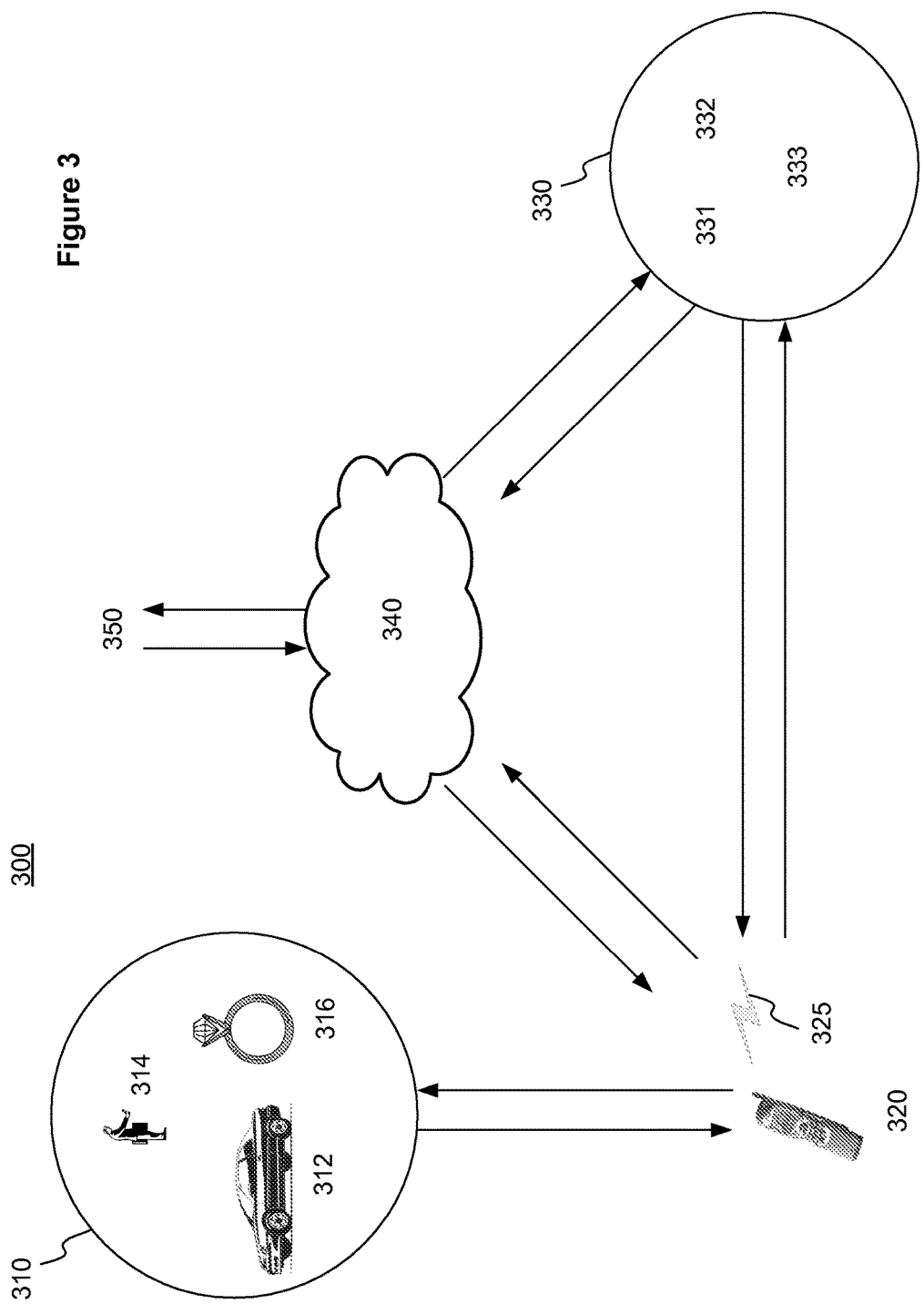
FIG. 3 illustrates systems that may track the approximate location of a person or thing as a function of time.

FIG. 3 illustrates systems that may track the approximate location of a person or thing insured as a function of time. System 300 may include a person or thing insured 310, a device 320, intermediate communications equipment 330, a network 340 and an insurer 350. The person or thing insured 310 may be an automobile 312, a person 314 or a ring 316 for example. Examples of intermediate communications equipment 330 include cell phone towers 331, satellites 332, utility network data collectors 333, and the like.

The device 320, intermediate communications equipment 330 and insurer 350 may communicate with one another directly or may communicate with one another by way of network 340, such as a communications network. The network 340 may include, for example, an intranet, the Internet, a local area network (LAN), a wide area network (WAN), a public switched telephone network (PSTN), a cellular network, a voice over internet protocol (VoIP) network. As an example, the device 320 may communicate with insurer 350 directly, through intermediate communications equipment 330, through network 340 and/or through network 340 via intermediate communications equipment 330. In addition, a person, such as a policy holder or person insured 310 may use the device 320 to communicate through any of the paths enabled by the device 320.

Device 320 may act as a transmitter and receiver. Device 320 may be a wireless phone, a computer, a facsimile machine, an imbedded chip, a watch, or a personal digital assistant (PDA), a portable email device, a navigation device, a GPS device, a pager, a public computing device, or the like, or, any combination thereof, for example. Device 320 may include a receiver, such as, for example, a GPS receiver for receiving GPS information, such as coordinate and time information, related to device 320.

Location information pertaining to the person or thing insured 310 may be received from a variety of types of position determining equipment having different underlying technologies, such as: GPS (Global Positioning System); angle of arrival (AOA) or triangulation; time difference of arrival (TDOA); Line of Sight (LOS); signal strength; geo-fencing; etc. FIG. 3 illustrates exemplary systems such as cell phone tower 331, GPS/communications satellite 332, utility network data collector 333, which may assist in the determination of the location of device 320 associated with person or thing insured 310. For example, GPS/communications satellites 332 may include multiple satellites that orbit above the Earth, comprising a GPS system. The GPS satellites may each contain a computer, an atomic clock, and a radio, operating to continuously broadcast its changing position and time. A GPS receiver, such as the receiver in device 320, may contain a computer or processing unit operating to calculate the position of the GPS receiver through receipt of time signals. The position may be calculated from three satellites through a process called trilateration or through a process called triangulation, for example. The position may be provided in the form of a longitude and latitude. The GPS receiver may further calculate altitude, speed of travel, and direction of travel.

As another example, a person or thing insured 310 may have an embedded chip. An electromagnetic wave may be broadcast that may interact with the embedded chip returning information that indicates the location of the chip, and therefore, the location of the person or thing insured 310.

The location based technology may continuously determine the location of the person or thing insured 310, such as through device 320. The location based technology may also work to determine the location of the person or thing insured 310 at discrete times, such as set intervals. The location information may be sent to the insurer 350. The insurer 350 may use the location information to determine such things as whether the person or thing insured 310 has changed risk zones, the amount of time spent in each risk zone, a new premium associated with the new risk zone, etc.

Figure 4:
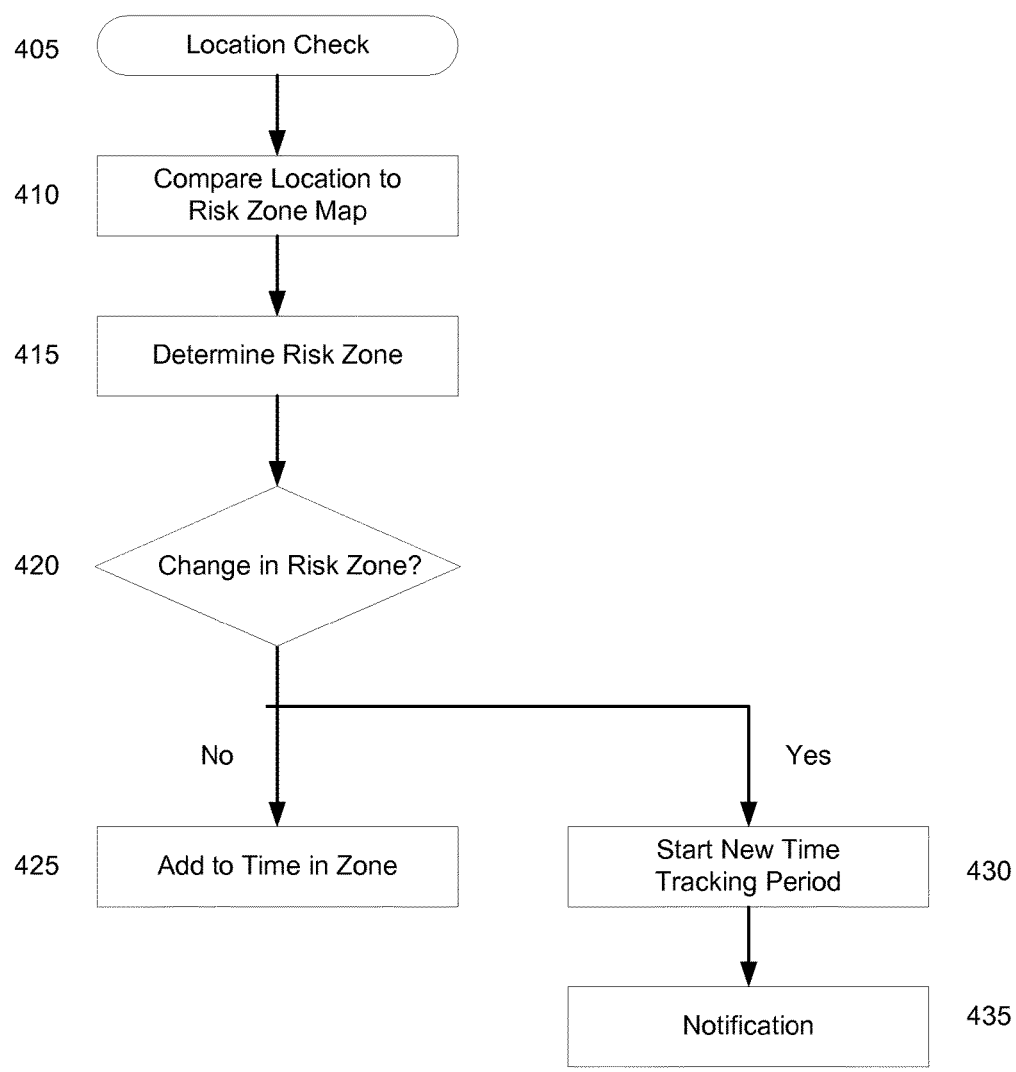
FIG. 4 illustrates an exemplary method for providing, or receiving, location-variable insurance.

FIG. 4 depicts an exemplary method for providing, or receiving, location-variable insurance. At 405, a location check is performed. The approximate current location of the person or thing insured may be identified using location-based technology as described above, such as GPS. For example, a location determination module may employ a device associated with the person or thing insured and GPS technology to assist in a location determination process. At 410, the approximate current location of the person or thing insured may be compared to a risk zone map. At 415, a determination may be made of a risk zone in which the person or thing insured is currently located.

At 420, a determination is made whether the person or thing insured has changed risk zones compared to the last time the approximate current location of the person or thing insured was identified. A risk zone may be considered changed if the risk of loss factor has changed for approximate current location of the person or thing insured compared to the last time the approximate current location of the person or thing insured was identified. One way for a person or thing insured to change risk zones is for the person or thing insured to physically move or be moved to a location in a different risk zone. As described above with reference to FIG. 2, risk zone boundaries may change over time. Thus, a person or thing insured may change zones due to the passage of time, without physical movement. In addition, the combination of movement with the passage of time may also cause a change in risk zones.

At 425, if the person or thing insured remained in the same risk zone, the time elapsed is added to the total time spent in the risk zone. That is, the time elapsed since the last time the approximate current location of the person or thing insured was identified is added to the time that the person or thing insured spent in the risk zone. As an example, consider a person that is insured. Further, the person is at home from 12:00 AM to 8:00 AM, where the home during that time is in a risk zone with an 'A' risk of loss factor. The person is then at work in a risk zone with a 'G' risk of loss factor from 8:00 AM to 4:00 PM. The person is then back at home in a risk zone with an 'A' risk of loss factor from 4:00 PM to 12:00 PM. Location checks may be performed every minute. For the above example, at 1:00 AM, the method would change the time spent in an 'A' risk of loss factor risk zone for the particular day from 59 minutes to 60 minutes. At the end of the exemplary day, the time and location information may be kept as 16 hours in an 'A' risk of loss factor risk zone and 8 hours in a 'G' risk of loss factor risk zone.

At 430, if the person or thing insured has changed risk zones, a new time tracking period begins. Consider the above exemplary day. At 8:00 AM, it is determined that the person has changed risk zones. The person has gone from an 'A' risk of loss factor risk zone to a 'G' risk of loss factor risk zone. Thus, the method records the time the person spent in the 'G' risk of loss factor risk zone at 8:00 AM.

Method 400 may be used to charge premiums that more accurately reflect the potential risk of loss compared to providing coverage over a wide range of risk zones, some of which the person or thing insured may never enter.

Method 400 may also provide a notification, at 435, that a change in risk zone has taken place. The notification may be sent to anyone, such as policy holder. The notification may be sent via the device 320 or by any appropriate method, such as through a phone, facsimile, pager, email, or other electronic notification. The notification may simply provide notification of a change in zones. The notification may also provide information relating to the change in the risk of loss factor associated with the change in zones. In addition, the notification may provide information relating to a premium change associated with the change in zones.

Figure 5:
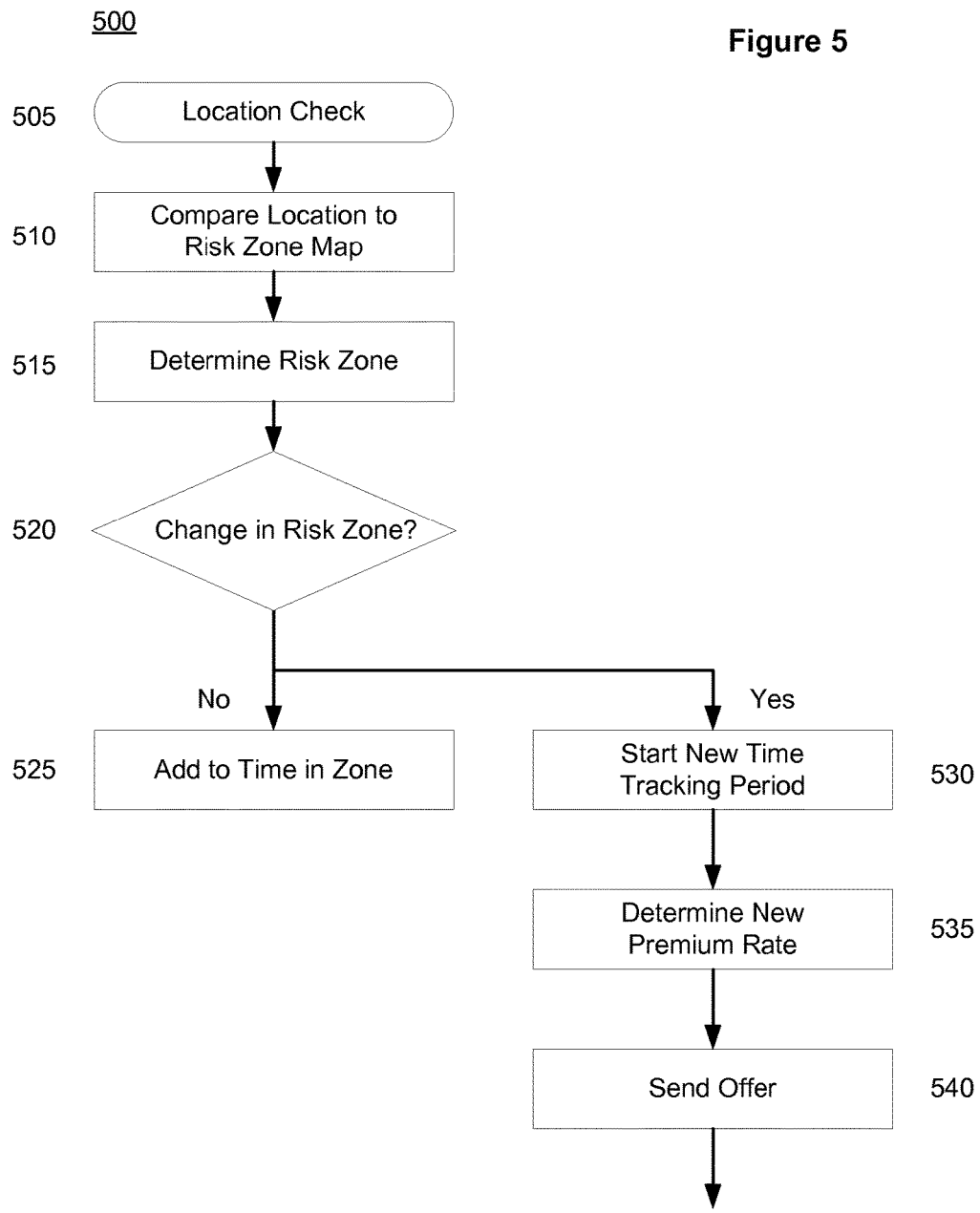
FIGS. 5 and 6 illustrate an exemplary method for providing, or receiving, location-variable insurance.
Figure 6:
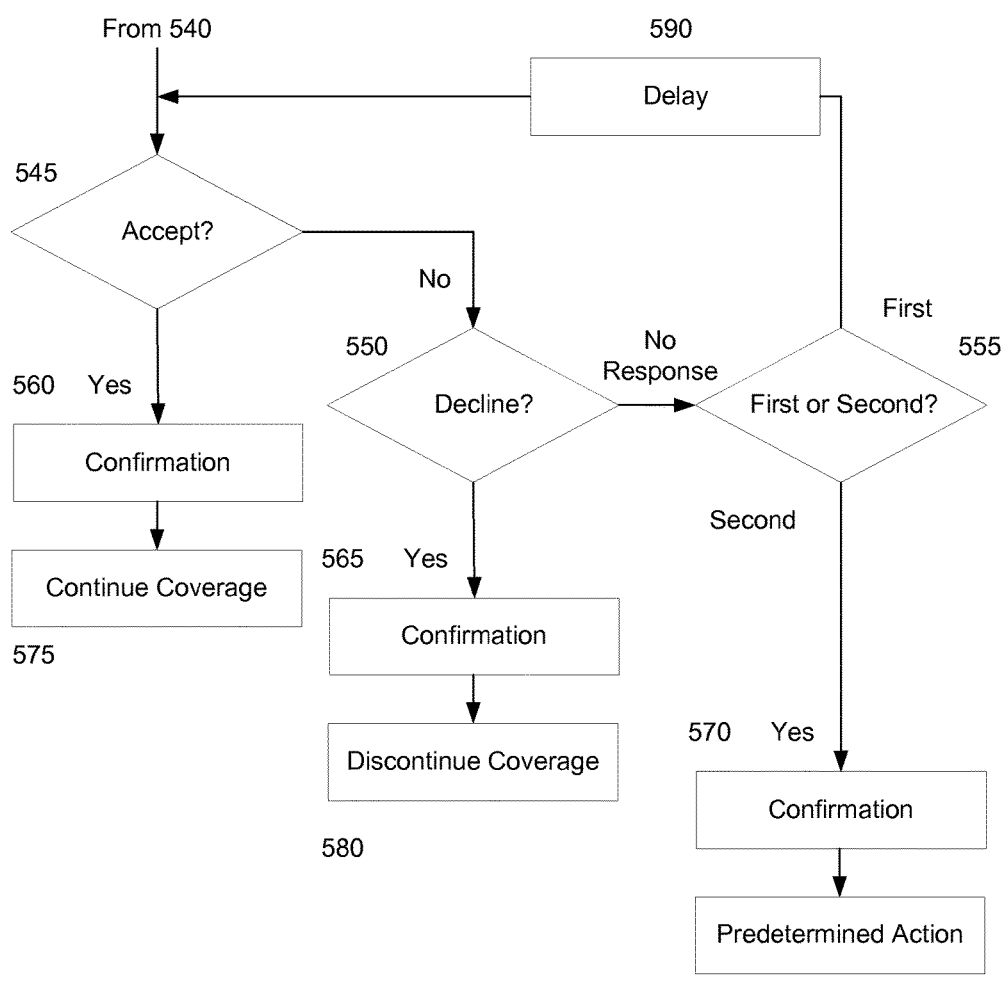

FIG. 5 depicts an exemplary method for providing, or receiving, location-variable insurance. At 505, a location check is performed. The approximate current location of the person or thing insured may be identified using location-based technology as described above, such as GPS. For example, a location determination module may employ a device associated with the person or thing insured and GPS technology to assist in a location determination process. At 510, the approximate current location of the person or thing insured may be compared to a risk zone map. At 515, a determination may be made of a risk zone in which the person or thing insured is currently located.

At 520, a determination is made whether the person or thing insured has changed risk zones compared to the last time the approximate current location of the person or thing insured was identified. A risk zone may be considered changed if the risk of loss factor has changed for approximate current location of the person or thing insured compared to the last time the approximate current location of the person or thing insured was identified. One way for a person or thing insured to change risk zones is for the person or thing insured to physically move or be moved to a location in a different risk zone. As described above with reference to FIG. 2, risk zone boundaries may change over time. Thus, a person or thing insured may change zones due to the passage of time, without physical movement. In addition, the combination of movement with the passage of time may also cause a change in risk zones.

At 525, if the person or thing insured remained in the same risk zone, the time elapsed is added to the total time spent in the risk zone. That is, the time elapsed since the last time the approximate current location of the person or thing insured was identified is added to the time that the person or thing insured spent in the risk zone. As an example, consider a person that is insured. Further, the person is at home from 12:00 AM to 8:00 AM, where the home at that time is in a risk zone with an 'A' risk of loss factor. The person is then at work in a risk zone with a 'G' risk of loss factor from 8:00 AM to 4:00 PM. The person is then back at home in a risk zone with an 'A' risk of loss factor from 4:00 PM to 12:00 PM. Location checks may be performed every minute. For the above example, at 1:00 AM, the method would change the time spent in an 'A' risk of loss factor risk zone for the particular day from 59 minutes to 60 minutes. At the end of the exemplary day, the time and location information may be kept as 16 hours in an 'A' risk of loss factor risk zone and 8 hours in a 'G' risk of loss factor risk zone.

At 530, if the person or thing insured has changed risk zones, a new time tracking period begins. Consider the above exemplary day. At 8:00 AM, it is determined that the person has changed risk zones. The person has gone from an 'A' risk of loss factor risk zone to a 'G' risk of loss factor risk zone. Thus, the method records the time spent in the 'G' risk of loss factor risk zone at 8:00 AM.

At 535, a new premium rate associated with the change in risk zones may be determined. For example, there may be a premium rate of one dollar per ten-thousand dollars of coverage per hour for an 'A' risk of loss factor risk zone, while the premium rate may be one dollar and sixty cents per ten-thousand dollars of coverage per hour for a 'G' risk of loss factor risk zone. At 540, an offer may be sent, for example to the policy holder, offering continued coverage at the new premium rate. The offer may be accepted, declined or there may be no response, which may be a first lack of response or a subsequent lack of response.

At 545 it is determined whether the offer has been accepted. If the offer has been accepted, a confirmation may be sent at 560 and coverage continued at 575. If the offer has not been accepted, at 550 it is determined whether the offer has been declined. If the offer has been declined, a confirmation may be sent at 565 and coverage discontinued at 580. If there has been no response to the offer, a determination is made whether it is the first time there has been no response or the second time there has been no response. If it is the first time there has been no response to the offer, the process returns to 545 after a delay 590. If it is the second time there has been no response to the offer, a confirmation may be sent at 570. In addition, if there is a second lack of response, coverage may be modified as dictated by predetermined or default choices 585. For example, it may be agreed upon beforehand what steps may be taken when there is a lack of response. Some examples include automatic discontinuation, automatic continuation or conditional automatic continuation, such as continuation below a defined premium rate.

What is claimed:

1. A computer-implemented method to provide location-variable insurance offers to a policyholder, the method comprising:
   dividing, via a processor of the computer, an insured area into a plurality of risk zones, wherein each of the plurality of risk zones has a respective geographical boundary and a respective premium rate;
   receiving, via the processor, a current location of a policyholder of an insurance policy from a portable electronic device of the policyholder, wherein the insurance policy is associated with a first risk zone of the plurality of risk zones;
   determining, via the processor, that the policyholder has physically moved outside of the respective geographical boundary of the first risk zone and into respective geographical boundary of a second risk zone of the plurality of risk zones based on the current location of the policyholder; and in response to determining that the policyholder has physically moved, determining, via the processor, an offer for a modified insurance policy based on the respective premium rate of the second risk zone, and then sending, via the processor, a notification that includes the offer to the portable electronic device of the policyholder.

2. The method of claim 1, wherein receiving the current location of the policyholder comprises receiving, via the processor, the current location by using a global positioning system receiver associated with the portable electronic device of the policyholder.

3. The method of claim 1, further comprising maintaining, via the processor, information about how much time the policyholder spends within each of the plurality of risk zones.

4. A non-transitory computer-readable storage medium comprising computer-readable instructions tangibly embodied on the computer-readable storage medium, which, when executed by a processor of a computer system, provide location variable insurance offers to a policyholder, said computer-readable instructions comprising instructions that:

divide, via the processor, an insured area into a plurality of risk zones, wherein each of the plurality of risk zones has a respective geographical boundary and a respective premium rate;

receive, via the processor, a current location of a policyholder of an insurance policy from a portable electronic device of the policyholder, wherein the insurance policy is associated with a first risk zone of the plurality of risk zones;

determine, via the processor, that the policyholder has physically moved outside of the respective geographical boundary of the first risk zone and into respective geographical boundary of a second risk zone of the plurality of risk zones based on the current location of the policyholder; and in response to determining that the policyholder has physically moved, determine, via the processor, an offer for a modified insurance policy based on the respective premium rate of the second risk zone, and then send, via the processor, a notification that includes the offer to the portable electronic device of the policyholder.

5. The non-transitory computer-readable storage medium of claim 4, wherein receiving the current location of the policyholder comprises receiving the current location by using a global positioning system receiver associated with the portable electronic device of the policyholder.

6. The non-transitory computer-readable storage medium of claim 4, further comprising instructions that maintain information about how much time the policyholder spends within each of the plurality of risk zones.

7. A system for providing location-variable insurance, the system comprising:

a memory; and a processor in communication with the memory and configured to execute computer-readable instructions tangibly embodied on the memory, which, when executed by the processor, provide location-variable insurance offers by:

dividing an insured area into a plurality of risk zones, wherein each of the plurality of risk zones has a respective geographical boundary and a respective premium rate;

receiving a current location of a policyholder of an insurance policy from a portable electronic device of the policyholder, wherein the insurance policy is associated with a first risk zone of the plurality of risk zones;

determining, based on the current location of the policyholder, that the policyholder has physically moved outside of the respective geographical boundary of the first risk zone and into respective geographical boundary of a second risk zone of the plurality of risk zones; and in response to determining that the policyholder has physically moved, determining an offer for a modified insurance policy based on the respective premium rate of the second risk zone, and then sending a notification that includes the offer to the portable electronic device of the policyholder.

8. The system of claim 7, wherein the processor maintains information about how much time the policyholder spends within each of the plurality of risk zones.

9. The method of claim 1, wherein the modified insurance policy comprises continuing coverage of the insurance policy at the respective premium rate of the second risk zone.

10. The method of claim 1, further comprising:

waiting a predetermined amount of time for the policyholder to respond to the offer; and in response to determining that the policyholder has not responded to the offer within the predetermined amount of time, automatically discontinuing coverage of the insurance policy of the policyholder and sending, to the portable electronic device of the policyholder, an indication of discontinuing coverage of the insurance policy.

11. The method of claim 1, further comprising:

waiting a predetermined amount of time for the policyholder to respond to the offer; and in response to determining that the policyholder has not responded to the offer within the predetermined amount of time, automatically conditionally covering the policyholder under the modified insurance policy and sending, to the portable electronic device of the policyholder, an indication of the conditional coverage under the modified insurance policy.

12. The method of claim 11, wherein conditionally covering the policyholder comprises continuing coverage when the respective premium rate of the second risk zone is below a defined premium rate.

13. The method of claim 1, further comprising:

waiting a predetermined amount of time for the policyholder to respond to the offer; and in response to determining that the policyholder has not responded to the offer within the predetermined amount of time, automatically continuing coverage of the insurance policy of the policyholder and sending, to the portable electronic device of the policyholder, an indication of continuing coverage of the insurance policy.

14. The non-transitory computer-readable storage medium of claim 4, wherein the modified insurance policy comprises continuing coverage of the insurance policy at the respective premium rate of the second risk zone.

15. The non-transitory computer-readable storage medium of claim 4, wherein the computer-readable instructions further comprise instructions that:
  wait a predetermined amount of time for the policyholder to respond to the offer; and
  in response to determining that the policyholder has not responded to the offer within the predetermined amount of time, automatically discontinue coverage of the insurance policy of the policyholder and send, to the portable electronic device of the policyholder, an indication of discontinuing coverage of the insurance policy.

16. The non-transitory computer-readable storage medium of claim 4, wherein the computer-readable instructions further comprise instructions that:
  wait a predetermined amount of time for the policyholder to respond to the offer; and
  in response to determining that the policyholder has not responded to the offer within the predetermined amount of time, automatically conditionally cover the policyholder under the modified insurance policy and send, to the portable electronic device of the policyholder, an indication of the conditional coverage under the modified insurance policy.

17. The non-transitory computer-readable storage medium of claim 16, wherein conditionally covering the policyholder comprises continuing coverage when the respective premium rate of the second risk zone is below a defined premium rate.

18. The non-transitory computer-readable storage medium of claim 4, wherein the computer-readable instructions further comprise instructions that:
  wait a predetermined amount of time for the policyholder to respond to the offer; and
  in response to determining that the policyholder has not responded to the offer within the predetermined amount of time, automatically continue coverage of the insurance policy of the policyholder and send, to the portable electronic device of the policyholder, an indication of continuing coverage of the insurance policy.

19. The system of claim 7, wherein the modified insurance policy comprises continuing coverage of the insurance policy at the respective premium rate of the second risk zone.

20. The system of claim 7, wherein the computer-readable instructions further comprise instructions, when executed by the processor, to:
  wait a predetermined amount of time for the policyholder to respond to the offer; and
  in response to determining that the policyholder has not responded to the offer within the predetermined amount of time, automatically discontinue coverage of the insurance policy of the policyholder and send, to the portable electronic device of the policyholder, an indication of discontinuing coverage of the insurance policy.

21. The system of claim 7, wherein the computer-readable instructions further comprise instructions, when executed by the processor, to:
  wait a predetermined amount of time for the policyholder to respond to the offer; and
  in response to determining that the policyholder has not responded to the offer within the predetermined amount of time, automatically conditionally cover the policyholder under the modified insurance policy and send, to the portable electronic device of the policyholder, an indication of the conditional coverage under the modified insurance policy.

22. The system of claim 21, wherein conditionally covering the policyholder comprises continuing coverage when the respective premium rate of the second risk zone is below a defined premium rate.

23. The system of claim 7, wherein the computer-readable instructions further comprise instructions, when executed by the processor, to:
  wait a predetermined amount of time for the policyholder to respond to the offer; and
  in response to determining that the policyholder has not responded to the offer within the predetermined amount of time, automatically continue coverage of the insurance policy of the policyholder and send, to the portable electronic device of the policyholder, an indication of continuing coverage of the insurance policy.

24. The system of claim 7, wherein the computer-readable instructions further comprise instructions, when executed by the processor, to:
  wait a predetermined amount of time for the policyholder to respond to the offer; and
  in response to determining that the policyholder has not responded to the offer within the predetermined amount of time, automatically continue coverage of the insurance policy of the policyholder and send, to the portable electronic device of the policyholder, an indication of continuing coverage of the insurance policy.

25. The method of claim 1, comprising:
  receiving, from the portable electronic device of the policyholder, an indication of declining the offer from the portable electronic device of the policyholder; and
  in response to receiving the indication of declining the offer from the portable electronic device of the policyholder:
    sending, to the portable electronic device of the policyholder, an indication of discontinuing coverage; and
    discontinuing coverage of the insurance policy of the policyholder.

* * * * *